United States Patent
Eaton et al.

(10) Patent No.: US 10,924,153 B2
(45) Date of Patent: Feb. 16, 2021

(54) SYSTEMS AND METHODS FOR AN EXTERNAL VEHICLE WIRELESS CONNECTION

(71) Applicant: Ford Global Technologies, LLC, Dearborn, MI (US)

(72) Inventors: Eric Eaton, Lake Worth, FL (US); Pha Nguyen, Lake Worth, FL (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 16/278,636

(22) Filed: Feb. 18, 2019

(65) Prior Publication Data
US 2020/0266850 A1  Aug. 20, 2020

(51) Int. Cl.
| | | |
|---|---|---|
| H04B 7/005 | (2006.01) | |
| H04B 1/44 | (2006.01) | |
| G07C 5/00 | (2006.01) | |
| G07C 5/08 | (2006.01) | |
| H04W 64/00 | (2009.01) | |
| H04W 48/20 | (2009.01) | |
| H04W 48/18 | (2009.01) | |
| H04B 1/00 | (2006.01) | |

(52) U.S. Cl.
CPC ............. *H04B 1/44* (2013.01); *G07C 5/008* (2013.01); *G07C 5/0841* (2013.01); *H04B 1/0064* (2013.01); *H04W 48/18* (2013.01); *H04W 48/20* (2013.01); *H04W 64/003* (2013.01)

(58) Field of Classification Search
CPC ..... H04B 1/44; H04B 1/0064; H04W 64/003; H04W 48/18; H04W 48/20; G07C 5/0841; G07C 5/008

USPC ............ 370/278–281, 328–330, 338; 340/989–994

See application file for complete search history.

(56) References Cited

U.S. PATENT DOCUMENTS

| | | | |
|---|---|---|---|
| 6,792,296 B1 * | 9/2004 | Van Bosch | H04M 1/6083 455/569.2 |
| 8,508,419 B2 | 8/2013 | Petrucci et al. | |
| 9,110,161 B2 * | 8/2015 | Waters | H01Q 3/12 |
| 9,654,152 B2 * | 5/2017 | Colella | H04B 1/0064 |
| 10,266,148 B2 * | 4/2019 | Mohaupt | B60N 2/002 |
| 10,601,461 B1 * | 3/2020 | Eaton | H01Q 1/3291 |
| 2009/0104911 A1 * | 4/2009 | Watanabe | H04W 36/30 455/436 |
| 2010/0271261 A1 * | 10/2010 | Waters | G01S 19/24 342/357.77 |

(Continued)

FOREIGN PATENT DOCUMENTS

| | | |
|---|---|---|
| KR | 20130048553 A | 5/2013 |
| WO | 2010/112011 A1 | 10/2010 |

*Primary Examiner* — Thai D Hoang
(74) *Attorney, Agent, or Firm* — Michael Spenner; Eversheds Sutherland (US) LLP

(57) ABSTRACT

Systems and methods are disclosed for an external vehicle wireless connection. Example methods may include: determining a condition associated with a vehicle; determining, based on the condition, a switching state between a first antenna external to the vehicle and a second antenna internal to the vehicle associated with the vehicle; transmitting, based on the switching state and via the first antenna, a first signal on a first frequency and on a first network or on a second network; and transmitting, based on the switching state and via the second antenna, a second signal on a second frequency on the first network.

17 Claims, 9 Drawing Sheets

(56) References Cited

U.S. PATENT DOCUMENTS

| | | | |
|---|---|---|---|
| 2010/0317337 A1* | 12/2010 | Chakam | H01Q 1/3241 |
| | | | 455/422.1 |
| 2015/0217711 A1* | 8/2015 | Kawada | G08G 1/205 |
| | | | 701/31.5 |
| 2016/0087655 A1* | 3/2016 | Kim | H04W 4/029 |
| | | | 455/404.1 |
| 2016/0277079 A1* | 9/2016 | Fikar | H04B 7/0608 |
| 2017/0099686 A1* | 4/2017 | Green | H04L 5/14 |
| 2020/0037128 A1* | 1/2020 | Lu | H04B 7/0604 |

* cited by examiner

SYSTEMS AND METHODS FOR AN EXTERNAL VEHICLE WIRELESS CONNECTION

TECHNICAL FIELD

The disclosure relates generally to wireless connections, and more particularly relates to systems and methods for an external vehicle wireless connection.

BACKGROUND

Various control units, software interfaces, and corresponding hardware devices may serve to provide wireless connectivity for a vehicle, for example, using various vehicle-based antennas. However, the control units, other hardware, and software modules may not necessarily be able to provide reliable wireless coverage using conventional systems. In some cases, such conventional system may have various design shortcomings that may lead to reduced data throughput, increased antenna system footprint, increased antenna cost, or the like.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1A:
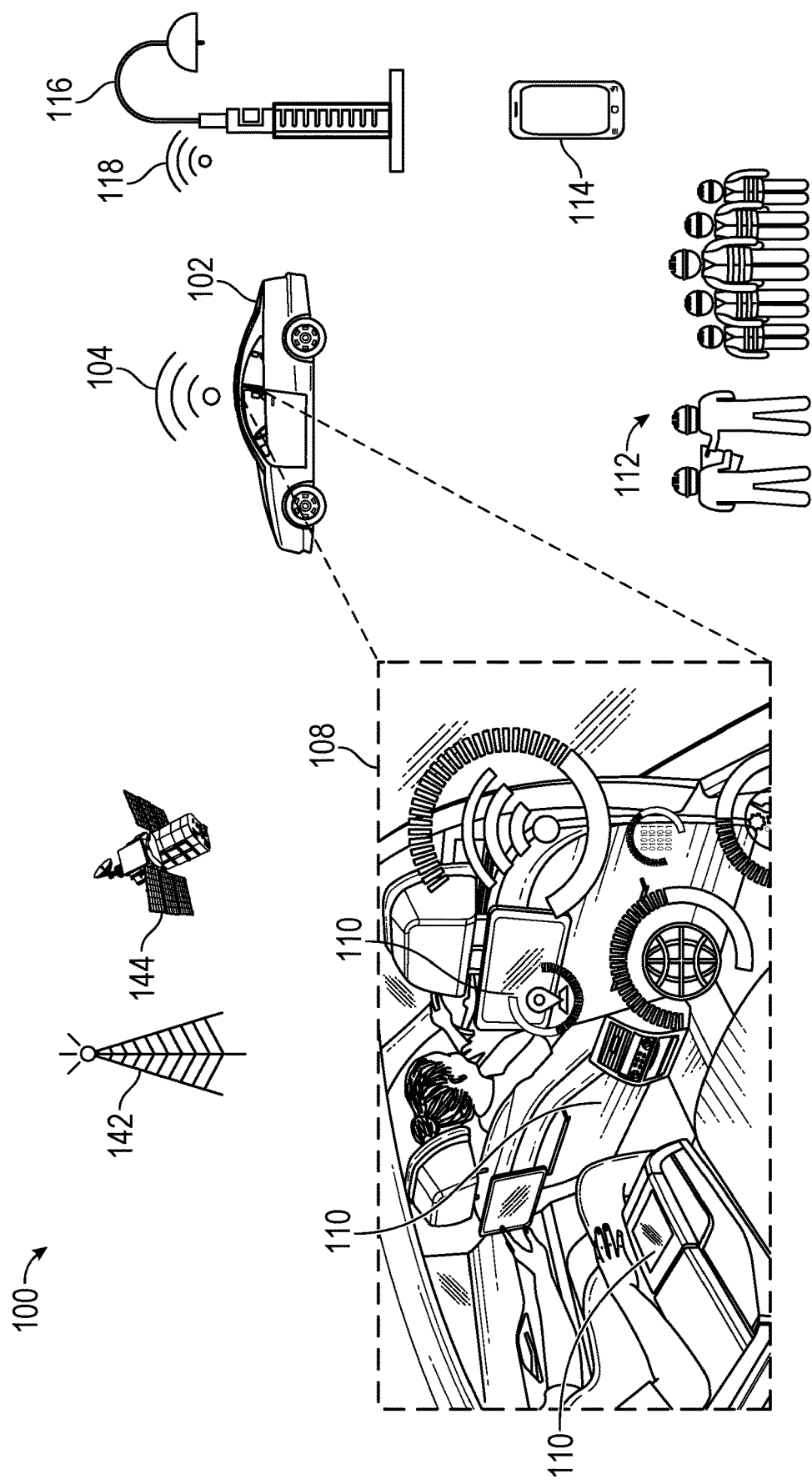
FIG. 1A is an illustration of an exemplary environmental context in which an antenna system may be used, in accordance with example embodiments of the disclosure.

Throughout the drawings, identical reference characters and/or descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As noted, various control units, software interfaces, and corresponding hardware devices may serve to provide wireless connectivity for a vehicle. In particular, a telematics control unit (TCU) and various software interfaces and corresponding hardware modules may serve to provide wireless (e.g., Wi-Fi, cellular, GPS, Bluetooth, near-field communication (NFC) or other wireless protocols) connectivity internal to the vehicles. In some aspects, the TCU and other hardware and/or software modules may include antennas integrated with the module. However, such components may not necessarily be able to provide reliable wireless (e.g., Wi-Fi) coverage exterior to a vehicle as well as interior to the vehicle using the internal antennas of the vehicle.

In some aspects, this lack of reliable wireless coverage exterior to the vehicle may be due to the presence of conductive materials (e.g., metal associated with the antennas) being in proximity to wireless (e.g., Wi-Fi) devices and/or modules. Additionally, the lack of reliable coverage exterior to the vehicle may be due to the internal antennas of the vehicle being positioned inside a metal cage created by the vehicle's body. In particular, the vehicle's body may serve as a Faraday cage causing a reduction in the performance of the internal antenna(s) to the exterior of the vehicle. Accordingly, because of the relatively poor signal coverage of the antennas, the vehicle may not be able to provide a reliable mobile (e.g., a mobile hotspot) connectivity in various external environments relative to the vehicle (e.g., job sites, outdoor environments, construction sites, and/or the like). Moreover, the vehicle may not be able to access existing wireless infrastructure components (e.g., outdoor Wi-Fi components), which may result in devices associated with the vehicle to use other networks (e.g., cellular networks) to send information, which may be limited by a lower bandwidth.

Further, there may be additional difficulties in enabling external network (e.g., Wi-Fi) coverage for a vehicle. For example, some wireless protocols (e.g., Wi-Fi protocols) may not be designed for certain mobile applications (e.g., vehicles moving even at relatively low speeds). Additionally, future releases of some wireless protocols (e.g., the Institute of Electrical and Electronics Engineers (IEEE) 802.11ax, 802.11ay, 802.11ba, or other IEEE specifications)

may not support communications having certain features, such as communications involving short bursts of data sent and received from devices moving at relatively higher speeds. Accordingly, such wireless protocols may not enable so-called fluid radio frequency (RF) coverage. In some aspects, other wireless protocols may not be supported by certain Wi-Fi devices (e.g., mobile phones, laptops, tablets, and/or the like). Moreover, enabling various wireless protocols may increase system cost. Further, wireless networks such as Wi-Fi may have to perform adequately inside the vehicle.

Embodiments of the disclosure may be directed to an antenna system including a dynamic switching network that may serve to maximize a wireless network (e.g., Wi-Fi, Bluetooth, near-field communication (NFC), or other wireless protocols) performance both internal and external to a vehicle. In various aspects, embodiments may include methods to control multiple antennas on a vehicle, the vehicle serving as a wireless access point (e.g., a mobile Wi-Fi hotspot), by dynamically switching between internal and external antennas. Further, the disclosed systems may control the dynamically switching antennas based on at least one of a state of motion of the vehicle, a speed of the vehicle, a presence of at least one other vehicle having a wireless capability (e.g., ability to serve as an access point or a base station) in a proximity of the vehicle, a network access point within the proximity of the vehicle, an arrival of the vehicle at a location, a departure of the vehicle from the location, a change of the vehicle's location (e.g., as determined, for example, using global positioning system (GPS) or other location determination means), an amount of time that the vehicle is at the location, combinations thereof, and/or the like. In some examples, the disclosed systems determine that there are no users and/or user devices in the vehicle, and the disclosed systems may therefore switch the antenna system to use the external antenna. In an example, the disclosed systems may determine the presence of an access point (e.g., another vehicle having a wireless capability or another entity having a wireless capability) in a proximity to the vehicle. Accordingly, the disclosed systems may switch the antenna system to use the internal antenna. In some embodiments, the disclosed systems may determine the lack of an access point or the lack of a sufficiently strong wireless (e.g., Wi-Fi) signal in an environment of the vehicle (e.g., within a predetermined proximity to the vehicle). Accordingly, the disclosed systems may switch to the external antenna (e.g., to provide wireless connectivity to devices external to the vehicle). Accordingly, the disclosed antenna systems and corresponding methods may enable a dynamic and reliable wireless coverage external to a vehicle while providing wireless coverage internal to vehicle.

FIG. 1A is an illustration of an exemplary environmental context in which the antenna system may be used, in accordance with example embodiments of the disclosure. In some aspects, FIG. 1A shows diagram 100 illustrating an environmental context for using the disclosed antenna system in conjunction with a vehicle. In particular, diagram 100 shows an environmental context including a vehicle 102, external wireless connection 104, vehicle interior 108, vehicle-based devices 110, external users 112, external devices 114, environmental features 116, environmental wireless connections 118, one or more satellites 142, and one or more cellular towers 144.

As noted, diagram 100 shows a vehicle 102. In various embodiments, the vehicle 102 may be associated with one or more users (e.g., a driver and one or more passengers). In one embodiment, the vehicle 102 may include vehicle-based devices 110, for example, user devices (e.g., mobile devices, tablets, laptops, and the like), to be described further below.

In one embodiment, the vehicle 102 may be any suitable vehicle such as a motorcycle, a car, a truck, a recreational vehicle (RV), a boat, plane, and/or the like, and may be equipped with suitable hardware and software that enables it to communicate over a network, such as a local area network (LAN) or a wide area network (WAN). In one embodiment, the vehicle 102 may include an autonomous vehicle (AV), as further described in connection with FIG. 7, below.

In another embodiment, the vehicle 102 may include a variety of sensors that may aid the vehicle in navigation, such as radio detection and ranging (RADAR), light detection and ranging (LIDAR), cameras, magnetometers, ultrasound, barometers, and/or the like. In one embodiment, the sensors and other devices of the vehicle 102 may communicate over one or more network connections. Examples of suitable network connections include a controller area network (CAN), a media-oriented system transfer (MOST), a local interconnection network (LIN), a cellular network, a Wi-Fi network, and other appropriate connections such as those that conform with known standards and specifications (e.g., one or more Institute of Electrical and Electronics Engineers (IEEE) standards and/or the like).

Diagram 100 shows an external wireless connection 104 which may be provided by external antenna(s) coupled to the exterior (e.g., the frame) of the vehicle 102, or internal antennas within the interior of the vehicle. In particular, the external wireless connection 104 may be configured to provide wireless connectivity to various external devices 114. Further, the disclosed systems may be configured to control the antennas of the vehicle to provide both external and internal wireless coverage using an antenna switching network, as will be further described in connection with FIG. 3, below.

In various embodiments, the external antenna(s) or the internal antenna(s) may include any suitable type of antenna corresponding to the communications protocols used by the user device and the devices of the vehicle. Some non-limiting examples of suitable external antenna(s) or internal antenna(s) include Wi-Fi antennas, location-determination antennas (e.g., Global Navigation Satellite System (GNSS) antennas), IEEE 802.11 family of standards compatible antennas, directional antennas, non-directional antennas, dipole antennas, folded dipole antennas, patch antennas, multiple-input multiple-output (MIMO) antennas, directional antennas, omni-directional antennas, or the like. The communications antenna may be communicatively coupled to a radio component to transmit and/or receive signals, such as communications signals to and/or from external entities (e.g., environmental features 116) and/or vehicle-based devices 110, and/or the like.

Diagram 100 of FIG. 1A shows a vehicle interior 108, within which various vehicle-based devices 110 may operate. Further, the vehicle interior 108 may have suitable proportions, shape, placement, and surfaces for vehicle-based devices 110, instrument panels, seats, door trim panels, headliner, pillar trims, and/or the like.

Diagram 100 shows vehicle-based devices 110, which, as noted, may be located in the interior vehicle 108. In particular, the vehicle-based devices 110 may include user device (e.g., a mobile phone, tablets, laptops, and/or the like) and/or vehicle devices such as navigation systems, radios, entertainment systems, and/or the like. Further, a user device may be configured to communicate with the one or more devices of the vehicle 102 using one or more communications networks, wirelessly or wired. Further, the vehicle 102 and/or any devices of the vehicle 102 may be configured to communicate using one or more communications networks, wirelessly or wired. In particular, the communications networks may be provided by the disclosed antenna systems and may be provided by external sources. The communications networks may include, but are not limited to, any one of a combination of different types of suitable communications networks such as, for example, broadcasting networks, public networks (for example, the Internet), private networks, wireless networks, cellular networks, or any other suitable private and/or public networks. Further, any of the communications networks may have any suitable communication range associated therewith and may include, for example, global networks (for example, the Internet), metropolitan area networks (MANs), WANs, LANs, or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In another embodiment, the vehicle-based devices 110 may include any suitable radio and/or transceiver for transmitting and/or receiving RF signals in the bandwidth and/or channels corresponding to the communications protocols utilized by any of the devices to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the IEEE 802.11 standards. In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHz channels (e.g., 802.11ad). In some embodiments, non-Wi-Fi protocols may be used for communications between devices, such as Bluetooth, dedicated short-range communication (DSRC), ultra-high frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

Diagram 100 further shows external users 112. In various embodiments, external users 112 may include, but not be limited to, workers at a work site, users at an event (e.g., concert, rally, etc.), people within a predetermined radius of the antenna system of the vehicle 102, and/or the like. In particular, external users 112 may use one or more external devices 114 to obtain wireless data using the antenna system of the vehicle 102. Further, the external devices 114 may include, but not be limited to, any suitable device (e.g., a mobile phone, tablets, laptops, and/or the like).

Diagram 100 shows environmental features 116 including environmental wireless connections 118, for example, in the context of a smart city environment. In some embodiments, the vehicle 102 and/or vehicle-based devices 110 may be configured to communicate with the environmental features 116 using the environmental wireless connections 118 and associated antenna system. In particular, the environmental features 116 may include an infrastructural element (e.g., a light pole, a store front, an Internet of things (IoT) device, or the like). Further, the environmental wireless connections 118 may include any suitable wireless connection such as Wi-Fi, cellular, Bluetooth, or the like.

Diagram 100 shows one or more satellites 142 and one or more cellular towers 144. In another embodiment, the vehicle 102 and associated antenna system may include a transceiver, which may, in turn, include one or more location receivers (e.g., GNSS antennas and/or receivers). Such location receivers and associated systems may be used to determine a condition of the vehicle (e.g., the vehicle's arrival at a particular location). In some embodiments, the transceiver may include GPS receivers that may receive location signals (e.g., GPS signals) from one or more satellites 142. In another embodiment, a GPS receiver may refer to a device that can receive information from GPS satellites (e.g., satellites 142) and calculate the vehicle's 110 geographical position. Using suitable software, the vehicle may display the position on a map displayed on a human-machine interface (HMI), and the GPS receiver may offer information corresponding to navigational directions. In one embodiment, GPS navigation services may be implemented based on the geographic position information of the vehicle provided by a GPS-based chip set/component.

In another embodiment, vehicle-based devices 110 (e.g., a user device or a navigation system) may use GPS signals received from a GNSS. In another embodiment, a user device (e.g., a smartphone) may also have GPS capability that may be used in conjunction with the GPS receiver, for example, to increase the accuracy of calculating the vehicle's 102 geographical position. In particular, the user's device may use assisted GPS (A-GPS) technology, which can use base station or cellular towers 144 to provide a faster time to first fix (TTFF), for example, when GPS signals are poor or unavailable. In another embodiment, the GPS receiver may be connected to other vehicle-based devices 110 associated with the vehicle 102. Depending on the type of electronic devices and available connectors, connections can be made through a serial or universal service bus (USB) cable, as well as a Bluetooth connection, a compact flash connection, a standard (SD) connection, a personal computer memory card international association (PCMCIA) connection, an ExpressCard connection, and the like.

In various embodiments, the GPS receiver may be configured to use an L5 frequency band (e.g., centered at approximately 1176.45 MHz) to determine a higher accuracy location (e.g., to pinpoint the vehicle 102 to approximately one-foot accuracy). In another embodiment, the location device may include the capability to detect location signals from one or more non-GPS-based systems, for example, to increase the location accuracy. For example, the location device may be configured to receive one or more location signals from a Russian global navigation satellite system (GLONASS), a Chinese BeiDou navigation satellite system, a European Union Galileo positioning system, an Indian regional navigation satellite system (IRNSS), and/or a Japanese quasi-zenith satellite system, and/or the like.

Figure 1B:
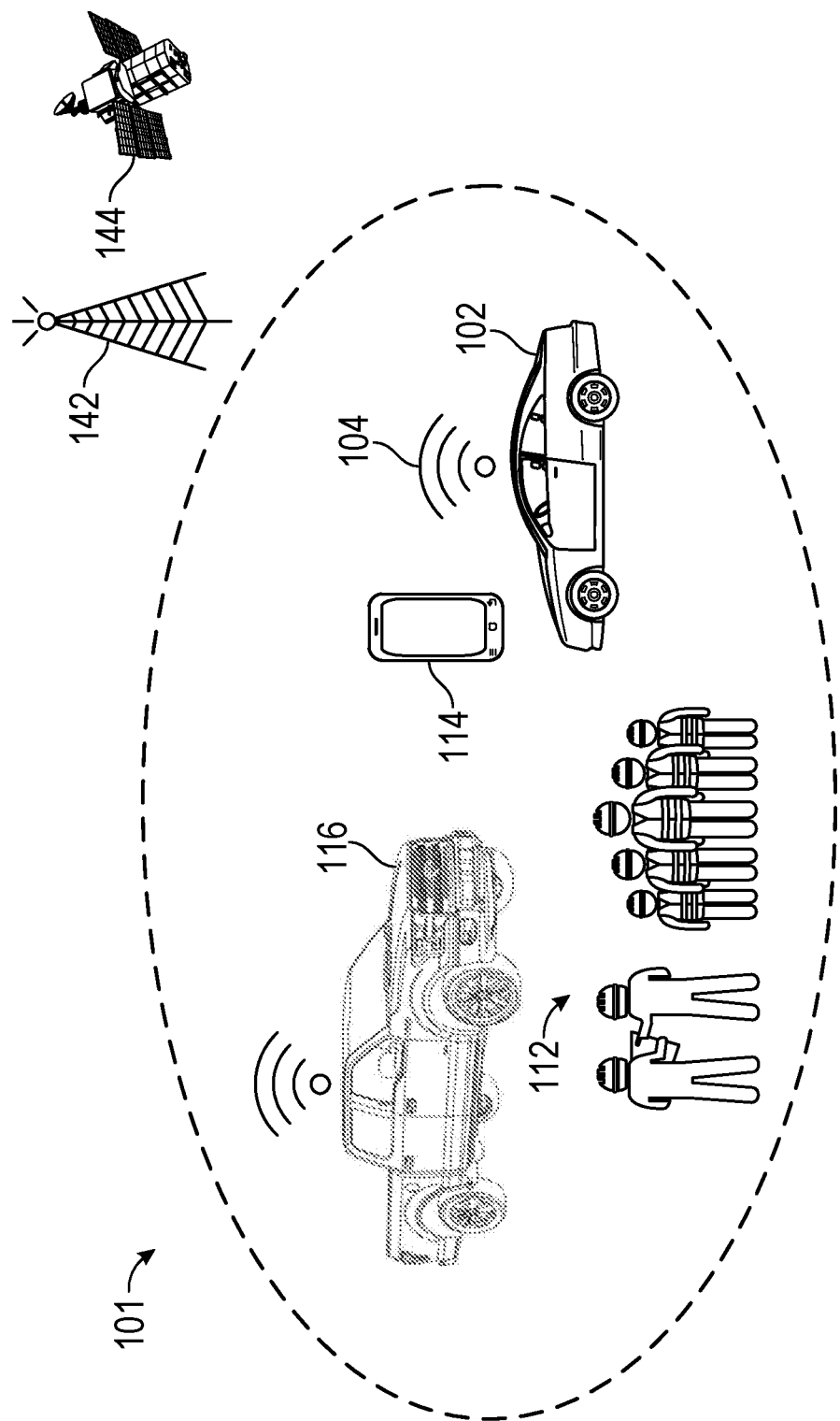
FIG. 1B is an illustration of another exemplary environmental context in which the antenna system may be used, in accordance with example embodiments of the disclosure.

FIG. 1B is an illustration of another exemplary environmental context in which the antenna system may be used, in accordance with example embodiments of the disclosure. In various embodiments, FIG. 1B includes a diagram 101 showing a vehicle 102 and a second vehicle 126 (e.g., a second vehicle having a wireless capability) in an environmental context. In various embodiments, the environmental context depicted in diagram 101 may include any suitable area (e.g., a home, a worksite, a mall, etc.). Diagram 101 also shows an external wireless connection 104, external users 112, external devices 114, one or more satellites 142, and one or more cellular towers 144, previously detailed in the description of FIG. 1A.

An example operational scenario is now described. The disclosed systems (e.g., the antenna system in association with any other suitable device) may first determine an initial condition of the vehicle 102. For example, the initial condition may include determining whether anyone in the vehicle 102, and/or determining whether any objects are attached to a switchable internal antenna path of the antenna system, to be further shown and described in connection with FIG. 3, below. In some examples, if the disclosed systems determine that there are no users and/or user devices in the vehicle 102, the disclosed systems may switch the antenna system to use the external antenna. In another aspect, this may serve as a default state of the disclosed systems (e.g., whenever there are no users and/or user devices in the vehicle, the disclosed systems may be configured to switch the antenna system to use the external antenna). In an example, the disclosed systems may determine the presence of an access point (e.g., another vehicle or entity having a wireless capability) in a proximity to the vehicle. Accordingly, the disclosed systems may switch the antenna system to use the internal antenna path. In some embodiments, the disclosed systems may determine the lack of an access point or the lack of a sufficiently strong wireless (e.g., Wi-Fi) signal in an environment of the vehicle (e.g., within a given proximity of the vehicle). Accordingly, the disclosed systems may switch the antenna system to the external antenna path (e.g., to provide wireless connectivity to devices external to the vehicle).

If the disclosed systems determine that the initial condition of the vehicle is suitable, the disclosed systems may then determine whether the vehicle 102 is in motion. For example, the disclosed systems may determine whether the vehicle 102 has a speed above a predetermined threshold (e.g., about 10 miles per hour). If so, the disclosed systems may switch the antenna system to use an internal antenna of the antenna system and may also determine the demand (e.g., usage demand) on the internal antenna. If the vehicle 102 does not have a speed above the predetermined threshold, the disclosed systems may switch the antenna system to the external antenna.

Moreover, when using the external antenna, the disclosed systems may identify data from the vehicle's 102 environment (e.g., one or more devices of a jobsite) and may determine, using the data, that the vehicle's environment includes a trusted site (e.g., a site that having a known identity). Further, the disclosed systems may send additional data over the antenna system to the various devices in the vehicle's 102 environment. In another embodiment, the disclosed systems may determine, at a given time, that the vehicle is departing the vehicle's 102 immediate environment using the various location determination capabilities of the vehicle 102 (e.g., GNSS communication capabilities, shown and described in connection with FIG. 1A, above). In some embodiments, the disclosed systems may identify another access point or another vehicle (e.g., second vehicle 126) having wireless capabilities, and may transmit a message to the other vehicle or access point to grant data transmission rights to the other vehicle. Having identified and authorized another vehicle (e.g., second vehicle 126) or access point to transmit data, the disclosed systems may then use the antenna switching network to switch the antenna system to use the internal antenna.

In another embodiment, when the disclosed systems determine that the vehicle 102 is in a slow-moving condition (e.g., less than 10 miles per hour), the disclosed systems may determine whether the vehicle 102 is in park or neutral. If so, the disclosed systems may determine whether the vehicle 102 has arrived at a particular environment (e.g., a jobsite, home, long-term parking location, and/or the like). Accordingly, the disclosed systems may determine whether there is an external access point (e.g., a base station, a hotspot, or another vehicle comprising an access point) available at the environment. If so, the disclosed systems may establish communications with the external access point. If not, the disclosed systems may use the external antenna of the antenna system to broadcast wireless (e.g., Wi-Fi) services. For example, the disclosed systems may broadcast beacon transmissions that may be detectable by any suitable device (e.g., user device) searching for wireless connectivity. The devices may then use the wireless services provided by the external antenna. In a further example, the disclosed systems may additionally broadcast a message over a wireless connection (e.g., a short message service (SMS) message over a cellular connection) to various external devices 114 in the vehicle's environment, the message indicative of the presence of the vehicle 102 having wireless capabilities. As noted, the disclosed systems may use the external antenna to provide wireless coverage to devices in the proximity of the antenna system of the vehicle 102.

Although one representative example of vehicle conditions and antenna switching is described above, the antenna switching network may switch the internal and external antennas of the antenna system based on any suitable condition of the vehicle 102. Example non-limiting conditions include: a time the vehicle 102 or another access point will be available in a given location, the presence of an on-demand extended range mobile access point network, the detection of a change in a location determination (e.g., GNSS) signal by an antenna of the antenna system (where the change is indicative of a movement of the vehicle), the determination that another vehicle 126 having another wireless access point capability is arriving or leaving a given location, the determination of one or more devices located inside and/or outside the vehicle 102, a balance-loading condition of channels inside or outside the vehicle 102, combinations thereof, and/or the like.

Figure 2:
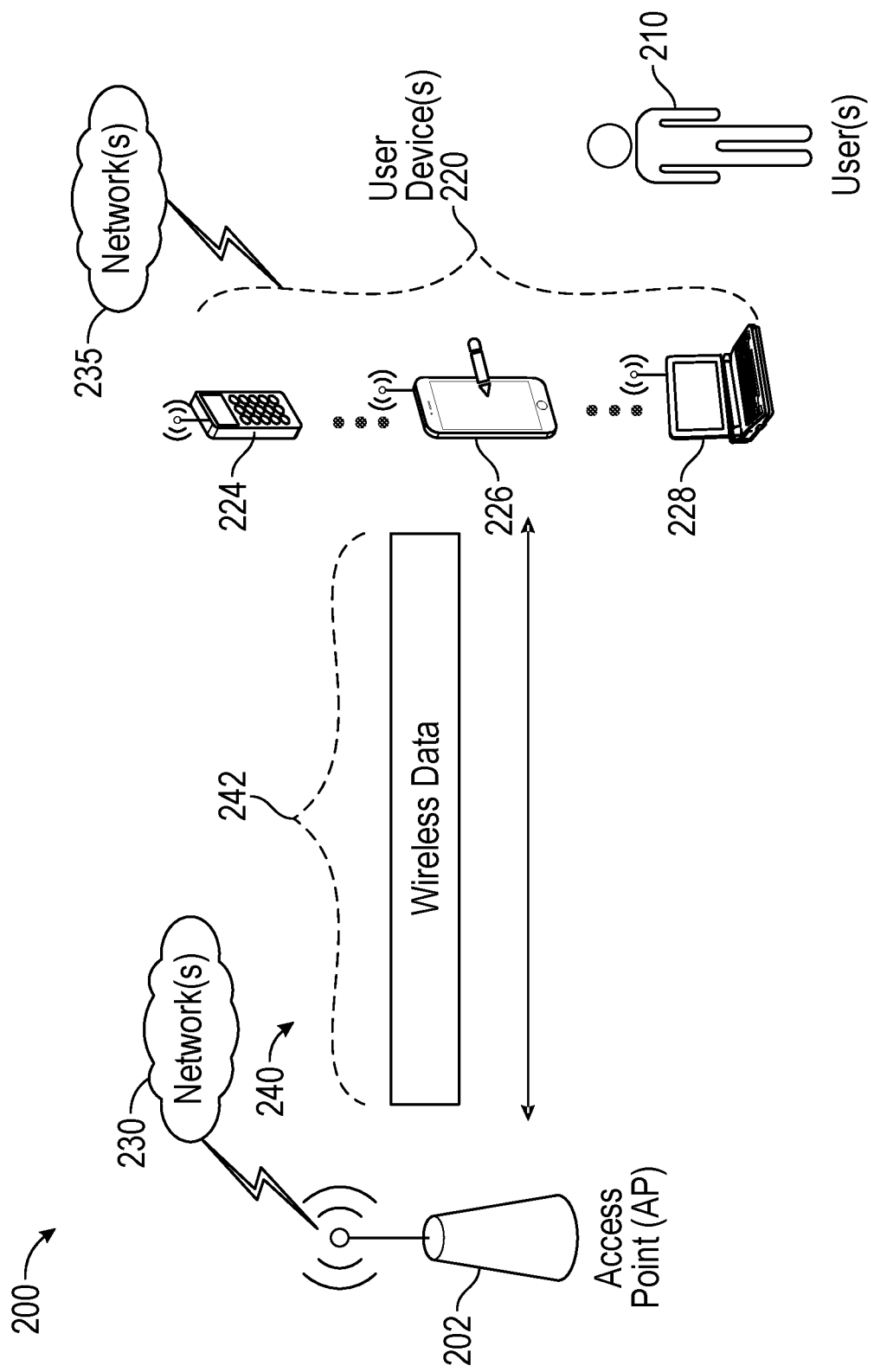
FIG. 2 shows a network diagram illustrating an example network environment, in accordance with some example embodiments of the present disclosure.

FIG. 2 is a network diagram illustrating an example network environment, according to some example embodiments of the present disclosure. Wireless network 200 may include one or more devices 220 (e.g., similar, but not necessarily identical to, vehicle-based devices 110 and/or external devices 114 shown and described in connection with FIG. 1, above) and one or more access point(s) (AP) 202 (e.g., including external and/or internal antennas for use in connection with FIG. 3, further described below), which may communicate in accordance with IEEE 802.11 communication standards, including IEEE 802.11ay. The device(s) 220 may be mobile devices that are non-stationary and do not have fixed locations.

The device(s) 220 (e.g., 224, 226, or 228) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth. In some embodiments, the devices 220 and AP 202 may include one or more computer systems similar to that of the functional diagram of FIG. 5 and/or the example machine/system of FIG. 6, to be discussed further.

Returning to FIG. 2, any of the user device(s) 220 (e.g., user devices 224, 226, 228), and AP 202 may be configured to communicate with each other via one or more communications networks 230 and/or 235 wirelessly or wired. Any of the communications networks 230 and/or 235 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 230 and/or 235 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 230 and/or 235 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 220 (e.g., user devices 224, 226, 228), and AP 202 may include one or more communications antennae. As noted, communications antenna may be any suitable type of antenna corresponding to the communications protocols used by the user device(s) 220 (e.g., user devices 224, 224 and 228), and AP 202. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 220.

As noted, any of the user devices 220 (e.g., user devices 224, 226, 228), and AP 202 may include any suitable radio and/or transceiver for transmitting and/or receiving radio frequency (RF) signals in the bandwidth and/or channels corresponding to the communications protocols utilized by any of the user device(s) 220 and AP 202 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an AP (e.g., AP 202) establishes communication with one or more user devices 220 (e.g., user devices 224, 226, and/or 228), the AP may communicate in the downlink direction by sending data frames (e.g., 242). The data frames may be preceded by one or more preambles that may be part of one or more headers. These preambles may be used to allow the user device to detect a new incoming data frame from the AP. A preamble may be a signal used in network communications to synchronize transmission timing between two or more devices (e.g., between the APs and user devices).

Figure 3:
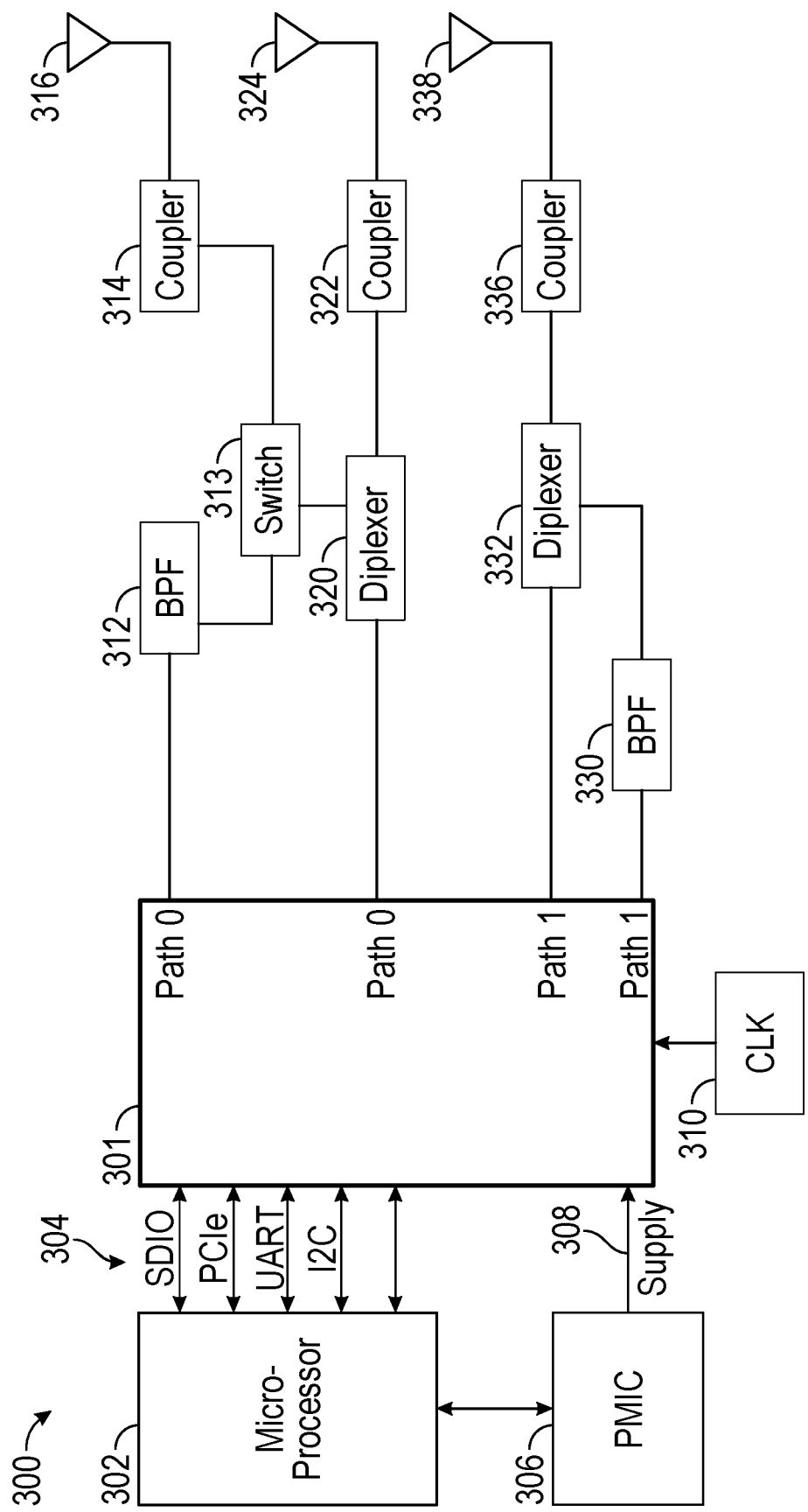
FIG. 3 is an illustration of an exemplary schematic of an antenna switching network, in accordance with example embodiments of the disclosure.

FIG. 3 is an illustration of an exemplary schematic of an antenna switching network, in accordance with example embodiments of the disclosure. In one embodiment, diagram 300 shows a schematic including an integrated circuit (IC) 301, a microprocessor 302, interface connections 304, a power management integrated circuit (PMIC) 306, a clock 310, a band-pass filter (BPF) 312, a switch 313, a coupler 314, an antenna 316, a diplexer 320, and a coupler 322, another antenna 324, an additional BPF 330, another diplexer 332, another coupler 336, and another antenna 338.

At a high-level, diagram 300 includes a schematic representing a switching network for an antenna system, which may operate in connection with various vehicle devices and sub-systems (e.g., a TCU of a vehicle). For example, the antenna system may include a wireless capability (e.g., a Wi-Fi capability) which may enable the antenna system to use either internal antennas (e.g., antennas 324 and/or 338) of the vehicle (e.g., TCU antennas) or to switch (e.g., via switch 313) to an external antenna (e.g., antenna 316) on an external antenna path. In some embodiments, an internal antenna (e.g., antenna 338) of the vehicle may include two Wi-Fi antennas internal to the TCU that may serve to support separate dual band multiple-input and multiple-output (MIMO) antennas in the approximately 5 GHz and the approximately 2.4 GHz bands. In some embodiments, one of the antenna paths may be split to go to the external antenna (e.g., antenna 324) such that Wi-Fi performance is maintained inside the vehicle.

Diagram 300 illustrates various components that may be used to implement the functionality of the antenna system described above as detailed below. In particular, diagram 300 shows an IC 301 and a microprocessor 302 that may be configured to control various states of the IC 301. In another embodiment, the IC 301 may be configured to control the various antennas and antenna paths of the antenna system. In another embodiment, the IC 301 may have wireless capabilities, such as Wi-Fi and/or Bluetooth capabilities. In one aspect, the microprocessor may include any suitable a computer processor that incorporates the functions of a central processing unit on an IC.

In one embodiment, the interface connections 304 shown in diagram 300 may provide inputs to the microprocessor 302. In particular, the interface connections 304 may include any suitable interfaces including, but not limited to, a standard input/output (SDIO) connection, a peripheral component interconnect express (PCIe) connection, a universal asynchronous receiver-transmitter (UART) connection, an inter-integrated circuit (I2C) connection, combinations thereof, and/or the like.

In one embodiment, the PMIC 306 shown in diagram 300 may refer to an IC for power management, and the PMIC may provide power to the microprocessor 302. Further, the PMIC may provide one or more of direct-current (DC) to DC conversion, battery charging, power-source selection, voltage scaling, power sequencing, and/or the like.

In one embodiment, the clock 310 shown in diagram 300 may be generated by any suitable circuit of the IC 301 in order to synchronize signals between any component internal or external to the IC 301.

In one embodiment, the BPF 312 shown in diagram 300 may filter various signals going to and from antenna 316. In various embodiments, the BPF 312 may refer to a device that passes frequencies within a certain range and rejects (attenuates) frequencies outside that range. In another embodiment, the BPF may include an analogue electronic band-pass filter such as a resistor-inductor-capacitor (RLC) circuit. In another embodiment, the BPF filter can include a low-pass filter combined with a high-pass filter. In one embodiment, the BPF may not attenuate all frequencies outside the desired frequency range completely; in particular, there may be a region just outside the intended passband where frequencies are attenuated, but not rejected. In another embodiment, the BPF may have roll-off as narrow as possible.

In some examples, the switch 313 may represent a type of electronic switch, which may refer to an electronic component or device that can switch an electrical circuit, interrupting the current or diverting it from one conductor to another. In some embodiments, a switch may include one or more sets of contacts, which may operate simultaneously, sequentially, or alternately. Further, the switch 313 may be connected to the BPF 312, the coupler 314, and the diplexer 320. The switch 313 may serve to switch the operation of the external antenna 316 and internal antenna 313 based on various vehicle conditions and/or environmental factors, as described herein.

In one embodiment, the coupler 314 shown in diagram 300 may also be referred to as an antenna tuner, matchbox, antenna tuning unit (ATU), antenna coupler, and/or a feedline coupler. May refer to a device connected between a device (e.g., IC 301) and the antenna (e.g., antenna 316) to improve power transfer between them by matching the impedance of the device to the combined impedance of the antenna and feedline.

In an embodiment, the antenna 316 shown in diagram 300 that may include an external antenna to the vehicle. Further, antenna 316 may be configured to operate on Wi-Fi and Bluetooth networks, and may be configured to operate on an approximately 2.4 GHz band. The antenna 316 may include any suitable antenna including, but not limited to, corresponding to the communications protocols used by the user device and the devices of the vehicle. Some non-limiting examples of suitable external antenna(s) include Wi-Fi antennas, location-determination antennas (e.g., GNSS antennas), IEEE 802.11 family of standards compatible antennas, directional antennas, non-directional antennas, dipole antennas, folded dipole antennas, patch antennas, MIMO antennas, or the like. The communications antenna may be communicatively coupled to a radio component to transmit and/or receive signals, such as communications signals to and/or from external entities and/or vehicle-based devices, and/or the like.

In one embodiment, the diplexer 320 shown in diagram 300 may be configured to optionally combine signals on having different frequencies (e.g., 2.4 GHz signals intended for external antenna 316 path and 5 GHz signals intended for internal antenna 324 path) on a common path to the external antenna 316. In particular, diplexer 320 may refer to a device that implements frequency-domain multiplexing. In one embodiment, the diplexer 320 may take signals having two different frequency bands in receive path and combines them in transmit path. In another aspect, the diplexer may be referred as RF power combiner/divider with the added functionality of filtering. For example, broadband filters may be used to pass appropriate bands.

In one embodiment, the coupler 322 shown in diagram 300, which may be configured to provide signals between the IC 301 and antenna 324. In one embodiment, the coupler 322 may be similar, but not necessarily identical to, coupler 314, described above. In one embodiment, diagram 300 shows an antenna 324. In one embodiment, the antenna 324 may be similar, but not necessarily identical to, antenna 316, described above. However, antenna 324 may be positioned internally to the vehicle and may be configured to operate on Wi-Fi and on a frequency of about 5 GHz. As noted, antenna 316 may be positioned external to the vehicle and may be configured to operate using both Bluetooth and Wi-Fi network on 2.4 GHz. In another embodiment, diagram 300 shows an additional BPF 330. In one embodiment, the BPF 330 may be similar, but not necessarily identical to, BPF 312, described above. The BPF 312 may filter signals from the IC 301 to diplexer 332. In one embodiment, the diplexer 332 may be similar, but not necessarily identical to, diplexer 320, described above. In particular, the diplexer 332 may communicate signals to coupler 336. In one embodiment, the coupler 336 may be similar, but not necessarily identical to, coupler 314, described above. In particular, the coupler 314 may communicate signals to antenna 338. In one embodiment, the antenna 338 may be similar, but not necessarily identical to, antenna 316, described above. However, antenna 316 may include an antenna that is positioned internal to the vehicle, and may include be configured to operate on both 2.4 GHz and 5 GHz frequencies for Wi-Fi.

Figure 4:
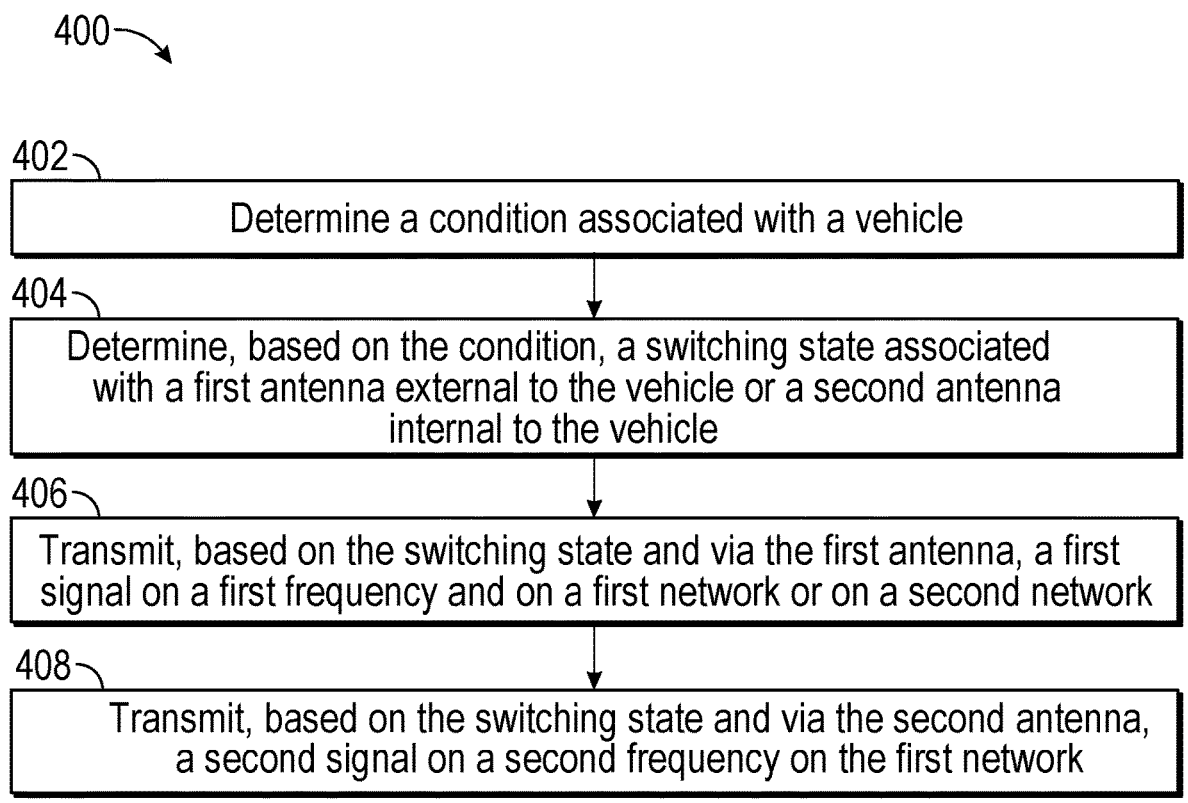
FIG. 4 is an illustration of an exemplary method for using the antenna systems, in accordance with example embodiments of the disclosure.

FIG. 4 is an illustration of an exemplary method 400 for using the antenna systems, in accordance with example embodiments of the disclosure. At block 402, the method may include determining a condition associated with a vehicle. In particular, the conditions may be determined for maximizing the availability of the various antennas (e.g., external and internal antennas) of the antenna system, for example, using an antenna switching network. In one embodiment, the disclosed systems may determine a state of motion of the vehicle or to determine a speed of the vehicle. In another embodiment, the disclosed systems may determine a presence of at least one other vehicle having a wireless capability (e.g., ability to serve as an access point or a base station) in a proximity of the vehicle or to determine a network access point within the proximity of the vehicle. In one embodiment, the disclosed systems may determine an arrival of the vehicle at a location, determine a departure of the vehicle from the location, a change of the vehicle's location (e.g., as determined, for example, using GPS or other location determination means), or determine an amount of time that the vehicle is at the location. The disclosed systems may further determine a state of motion of the vehicle, a balance of load conditions between internal and external devices to the vehicle, estimated amount of time at a location, on demand extended coverage outside of vehicle, combinations thereof, and/or the like.

At block 404, the method may include determining, based on the condition, a switching state associated with a first antenna external to the vehicle or a second antenna internal to the vehicle associated with the vehicle. As noted, the disclosed systems may perform switching using a network switching, as described in connection with FIG. 3, above. In various embodiment, the switching network may include an IC, a microprocessor, a switch, interface connections, a PMIC, a clock, a BPF, a coupler, an antenna, a diplexer, and various antennas, also described in connection with FIG. 3.

At block 406, the method may include transmitting, based on the switching state and via the first antenna, a first signal on a first frequency and on a first network or on a second network. In one embodiment, the first network may include a Wi-Fi network and the second network may include a Bluetooth network. In another embodiment, the first frequency is about 2.4 GHz and the second frequency is about 5 GH. In one embodiment, the disclosed systems may combine, via a diplexer, the first signal and the second signal into a combined signal. In another embodiment, the disclosed systems may couple, via a coupler, the combined signal to the first antenna.

At block 408, the method may include transmitting, based on the transmitting state and via the second antenna, a second signal on a second frequency on the first network. In one embodiment, the disclosed systems may transmit, via a third antenna internal to the vehicle, a third signal on the first frequency or on the second frequency and on the first network.

Figure 5:
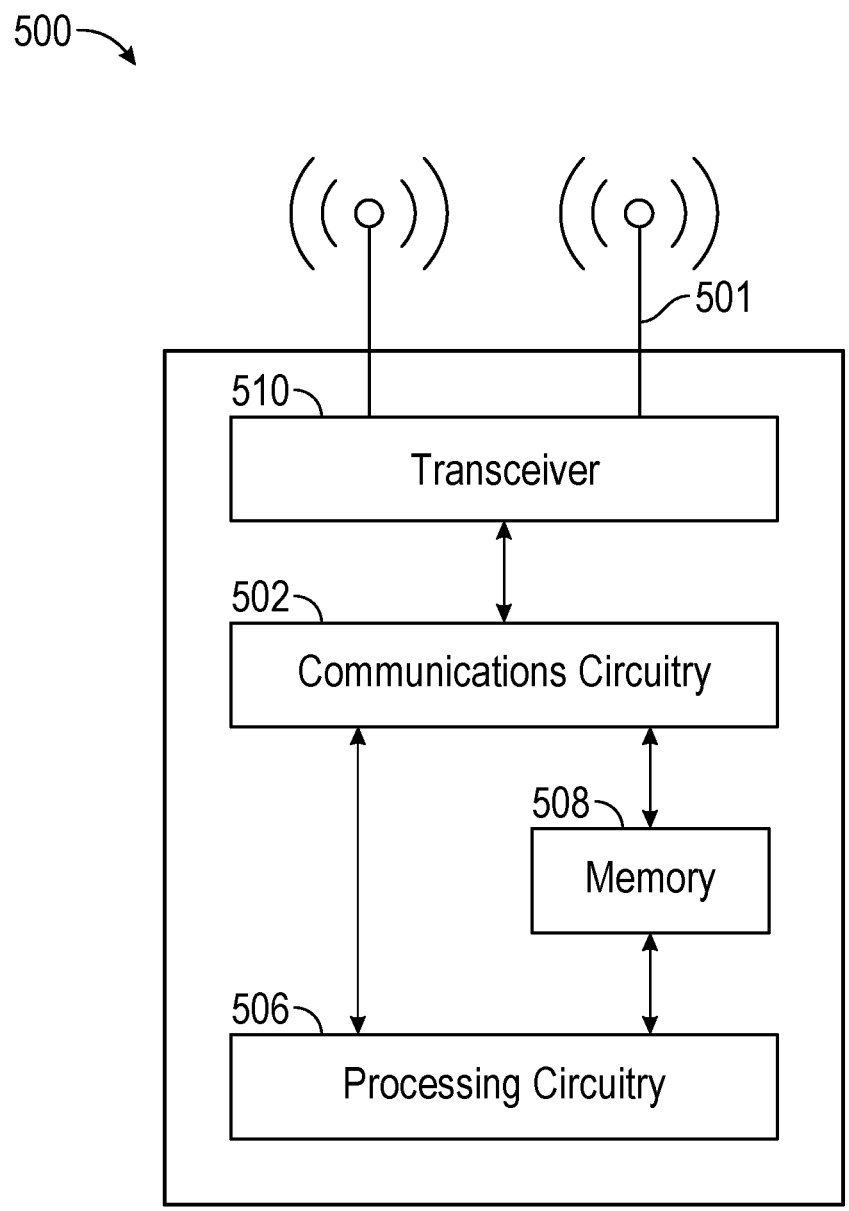
FIG. 5 shows a functional diagram of an exemplary communication station in accordance with some embodiments.

FIG. 5 shows a functional diagram of an exemplary communication station 500 in accordance with some embodiments. In particular, the communication station 500 may be part of the disclosed antenna system, and may be used in the transmission and reception of data over a network (e.g., a Wi-Fi or a Bluetooth network). In one embodiment, FIG. 5 illustrates a functional block diagram of a communication station that may be suitable for use as an AP 202 (FIG. 2) or communication station user device 220 (FIG. 2) in accordance with some embodiments. The communication station 500 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 500 may include communications circuitry 502 and a transceiver 510 for transmitting and receiving signals to and from other communication stations using one or more antennas 501 (e.g., similar, but not necessarily identical to, the antennas shown and described herein). The communications circuitry 502 may include circuitry that can operate the physical layer communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 1-4, above.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device may, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. As previously noted, the antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

Figure 6:
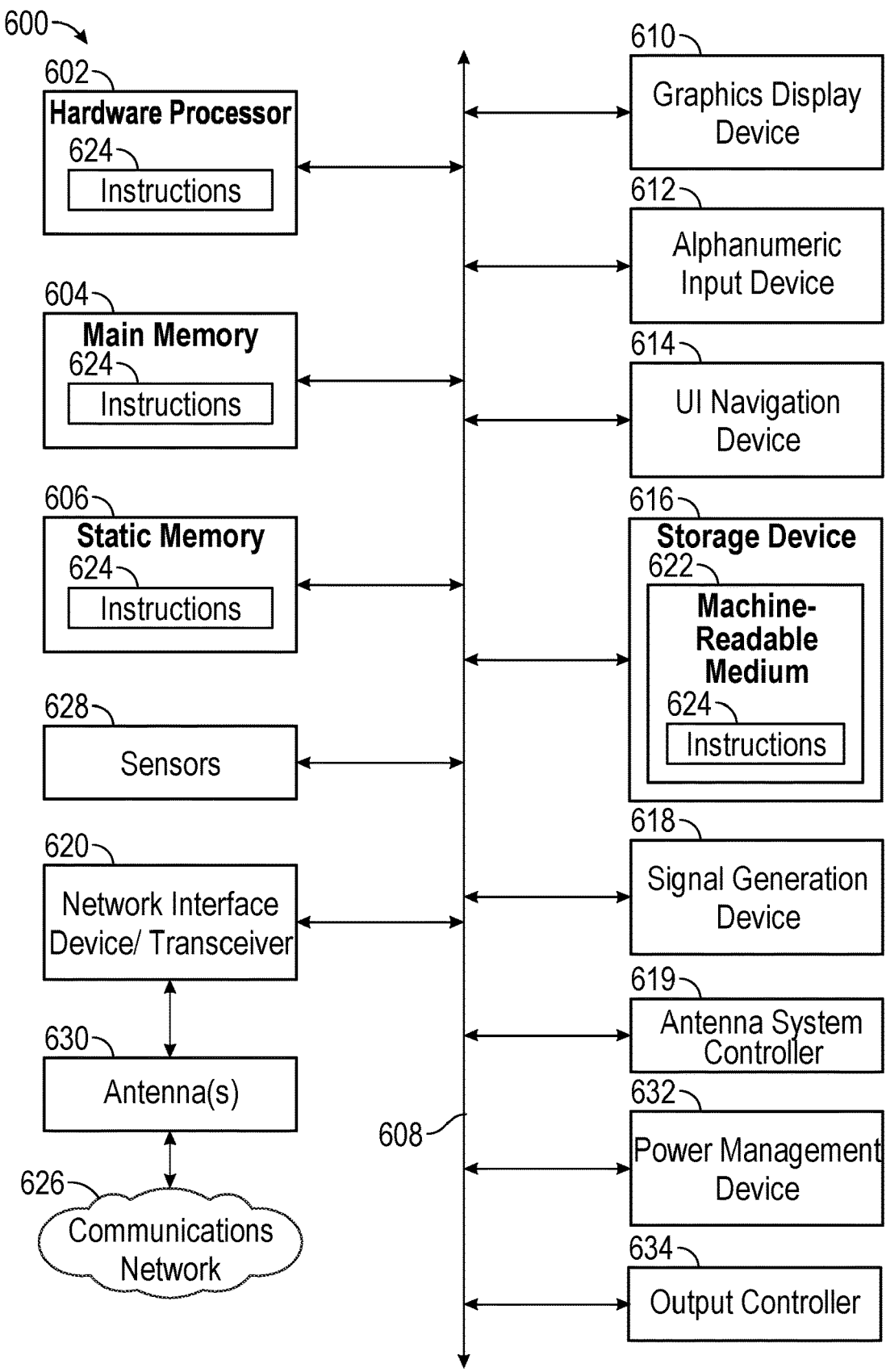
FIG. 6 illustrates a block diagram of an example of a machine or system upon which any one or more of the techniques discussed herein may be performed, in accordance with example embodiments of the disclosure.

FIG. 6 illustrates a block diagram of an example of a machine 600 or system upon which any one or more of the techniques (e.g., methodologies) discussed herein may be performed. For example, the machine 600 may be used in connection with the antenna system to perform any of the techniques described herein. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 1000 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an antenna system controller 619, a network interface device/transceiver 620 coupled to antenna(s) 630, and one or more sensors 628, such as a global positioning system (GPS) sensor, compass, accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.))

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The antenna system controller 619 may be configured to determine a condition associated with a vehicle. The antenna system controller 619 may be further configured determine, based on the condition, to switch between a first antenna external to the vehicle or a second antenna internal to the vehicle associated with the vehicle. In another embodiment, the antenna system controller 619 may be configured to transmit, via the first antenna, a first signal on a first frequency and on a first network (e.g., Wi-Fi) or on a second network (Bluetooth) and transmit, via the second antenna, a second signal on a second frequency on the first network.

In one embodiment, the antenna system controller 619 may be configured to combine, via a diplexer, the first signal and the second signal into a combined signal, and couple, via a coupler, the combined signal to the first antenna. Further, the antenna system controller 619 may be configured to transmit, via a third antenna internal to the vehicle, a third signal on the first frequency or on the second frequency and on the first network.

In another embodiment, the antenna system controller 619 may be configured to determine a state of motion of the vehicle or to determine a speed of the vehicle, to determine a presence of at least one other vehicle having a wireless capability (e.g., ability to serve as an access point or a base station) in a proximity of the vehicle or to determine a network access point within the proximity of the vehicle. Further, the antenna system controller 619 may be configured to determine an arrival of the vehicle at a location, determine a departure of the vehicle from the location, or determine an amount of time that the vehicle is at the location.

It is understood that the above are only a subset of what the antenna system controller 619 may be configured to perform and that other functions included throughout this disclosure may also be performed by the antenna system controller 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
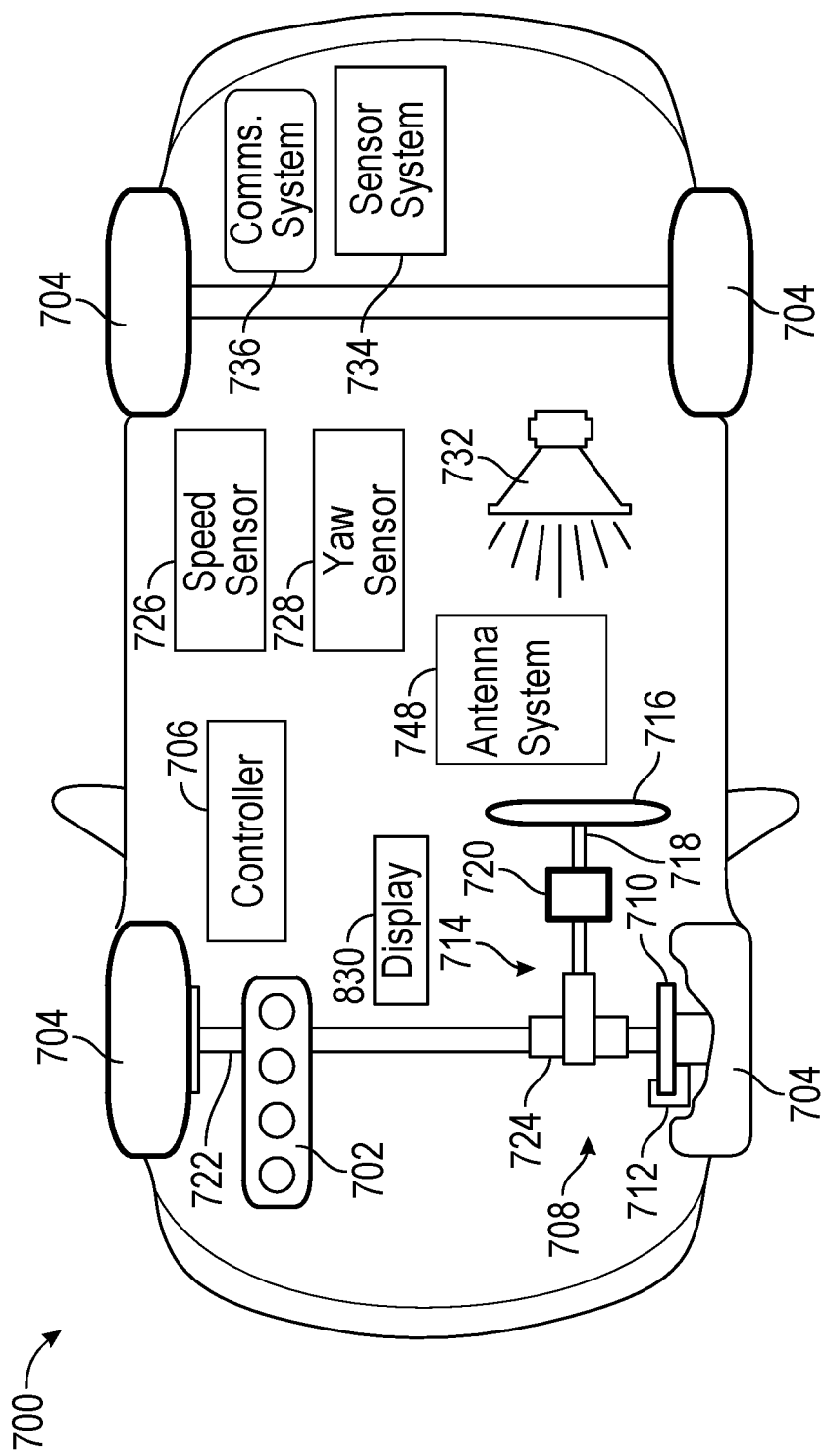
FIG. 7 is a schematic illustration of an example autonomous vehicle, in accordance with one or more embodiments of the disclosure.

FIG. 7 is a schematic illustration of an example autonomous vehicle in accordance with one or more embodiments of the disclosure. In particular, the antenna system and associated techniques described herein may be performed on any suitable vehicle including autonomous vehicles. In further examples, the antenna system may facilitate the interaction of an autonomous vehicle with its environment (e.g., a smart-city infrastructure, radio and Internet broadcasts, etc.). Referring to FIG. 7, an example autonomous vehicle 700 (which may correspond to the vehicle 102 of FIG. 1) may include a powerplant 702 (such as a combustion engine and/or an electric motor) that provides torque to drive wheels 704 that propel the vehicle forward or backward. Autonomous vehicle operation, including propulsion, steering, braking, navigation, and the like, may be controlled autonomously by a vehicle controller 706. For example, the vehicle controller 706 may be configured to receive feedback from one or more sensors (e.g., sensor system 734, etc.) and other vehicle components to determine road conditions, vehicle positioning, and so forth. The vehicle controller 706 may also ingest data from the speed monitor and yaw sensor, as well as the tires, brakes, motor, and other vehicle components. The vehicle controller 706 may use the feedback and the route/map data of the route to determine actions to be taken by the autonomous vehicle, which may include operations related to the engine, steering, braking, and so forth. Control of the various vehicle systems may be implemented using any suitable mechanical means, such as servo motors, robotic arms (e.g., to control steering wheel operation, acceleration pedal, brake pedal, etc.), and so forth. The controller 706 may be configured to process received data, and may be configured to interact with the user via the user interface devices in the car and/or by communicating with the user's user device.

The vehicle controller 706 may include one or more computer processors coupled to at least one memory. The vehicle 700 may include a braking system 708 having disks 710 and calipers 712. The vehicle 700 may include a steering system 714. The steering system 714 may include a steering wheel 716, a steering shaft 718 interconnecting the steering wheel to a steering rack 720 (or steering box). The front and/or rear wheels 704 may be connected to the steering rack 720 via an axle 722. A steering sensor 724 may be disposed proximate to the steering shaft 718 to measure a steering angle. The vehicle 700 also includes a speed sensor 726 that may be disposed at the wheels 704 or in the transmission. The speed sensor 726 is configured to output a signal to the controller 706 indicating the speed of the vehicle. A yaw sensor 728 is in communication with the controller 706 and is configured to output a signal indicating the yaw of the vehicle 700.

The vehicle 700 includes an antenna system 748, as variously described herein, for example, in connection with FIGS. 1-5, above.

The vehicle 700 includes a cabin having a display 730 in electronic communication with the controller 706. The display 730 may be a touchscreen that displays information to the passengers of the vehicle and/or functions as an input, such as whether or not the rider is authenticated. A person having ordinary skill in the art will appreciate that many different display and input devices are available and that the present disclosure is not limited to any particular display. An audio system 732 may be disposed within the cabin and may include one or more speakers for providing information and entertainment to the driver and/or passengers. The audio system 732 may also include a microphone for receiving voice inputs. The vehicle may include a communications system 736 that is configured to send and/or receive wireless communications via one or more networks. The communications system 736 may be configured for communication with devices in the car or outside the car, such as a user's device, other vehicles, etc.

The vehicle 700 may also include a sensor system for sensing areas external to the vehicle. The vision system may include a plurality of different types of sensors and devices such as cameras, ultrasonic sensors, RADAR, LIDAR, and/or combinations thereof. The vision system may be in electronic communication with the controller 706 for controlling the functions of various components. The controller may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers and/or computer processors. The controller 706 may receive signals from the sensor system 734 and may include memory containing machine-readable instructions for processing the data from the vision system. The controller 706 may be programmed to output instructions to at least the display 730, the audio system 732, the steering system 714, the braking system 708, and/or the powerplant 702 to autonomously operate the vehicle 700.

Figure 8:
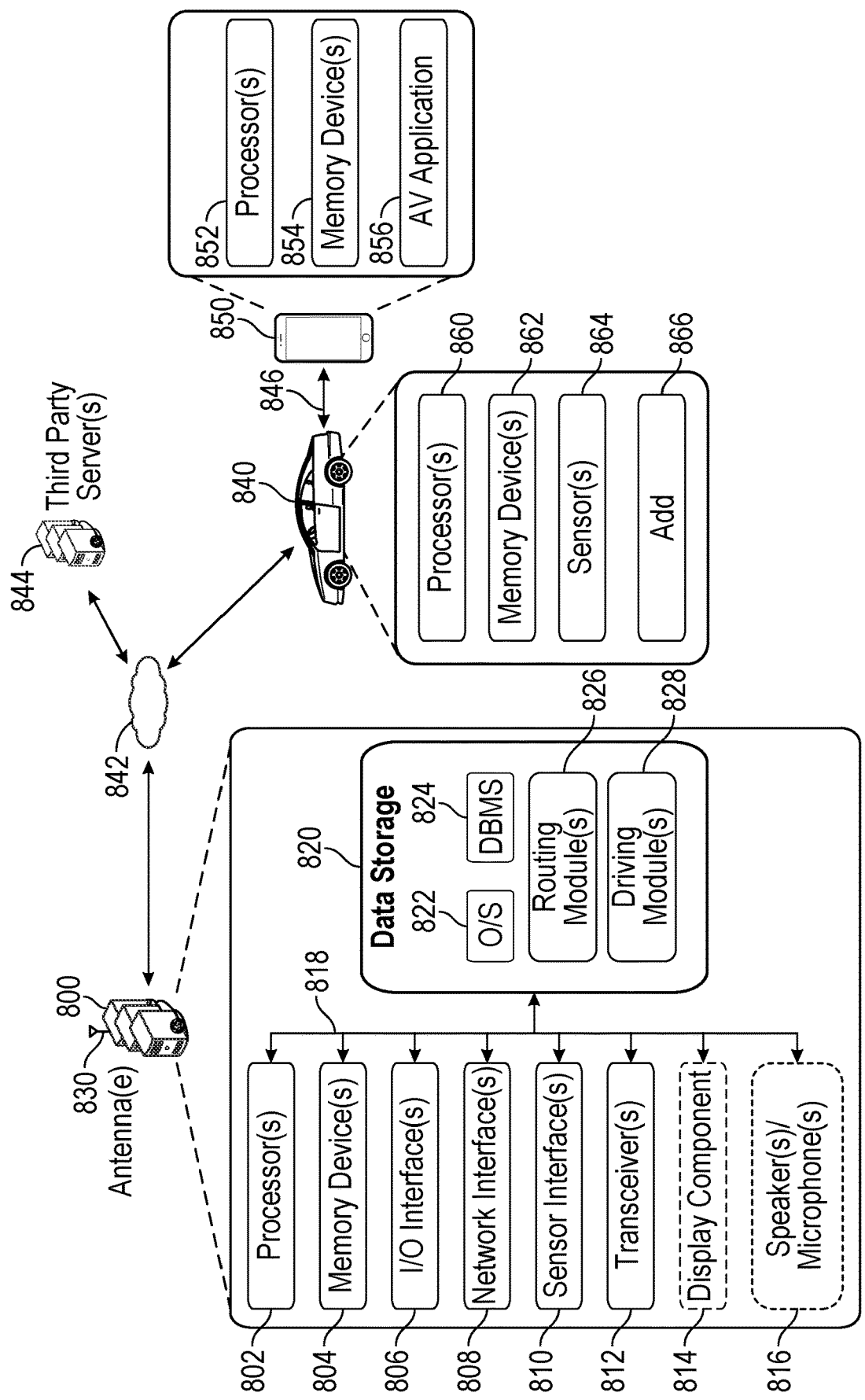
FIG. 8 is a schematic illustration of an example server architecture for one or more server(s), in accordance with one or more embodiments of the disclosure.

FIG. 8 is a schematic illustration of an example server architecture for one or more server(s) 800 in accordance with one or more embodiments of the disclosure. The server 800 illustrated in the example of FIG. 8 may correspond to a computer system configured to implement the functionality discussed with respect to FIGS. 1-8. In particular, the server 800 may be used to configure and/or transmit and receive information from the disclosed antenna system, as further described below. Some or all of the individual components may be optional and/or different in various embodiments. In some embodiments, the server 800 illustrated in FIG. 8 may be located at an vehicle 840. For example, some or all or the hardware and functionality of the server 800 may be provided by the vehicle 840. The server 800 may be in communication with the vehicle 840, as well as one or more third-party servers 844 (e.g., servers that store data from the antenna system, configuration information associated with the antenna system, and/or the like), and one or more user devices 850. The vehicle 840 may be in communication with the user device 850.

The server 800, the third-party server 844, the vehicle 840, and/or the user device 850 may be configured to communicate via one or more networks 842. The vehicle 840 may additionally be in wireless communication 846 with the user device 850 via a connection protocol such as Bluetooth or Near Field Communication. The server 800 may be configured to communicate via one or more networks 842. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display components 814, one or more optional camera(s)/speaker(s)/microphone(s) 816, and data storage 820. The server 800 may further include one or more bus(es) 818 that functionally couple various components of the server 800. The server 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a GNSS antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the server 800. The bus(es) 818 may include, without limitation, a memory bus or a memory controller, a peripheral bus, an accelerated graphics port, and so forth. The bus(es) 818 may be associated with any suitable bus architecture.

The memory 804 of the server 800 may include volatile memory (memory that maintains its state when supplied with power) such as random-access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

The data storage 820 may include removable storage and/or non-removable storage including, but not limited to, magnetic storage, optical disk storage, and/or tape storage. The data storage 820 may provide non-volatile storage of computer-executable instructions and other data.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. More specifically, the data storage 820 may store one or more operating systems (O/S) 822; one or more database management systems (DBMSs) 824; and one or more program module(s), applications, engines, computer-executable code, scripts, or the like such as, for example, one or more routing module(s) 826 and/or one or more driving module(s) 828. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The processor(s) 802 may be configured to access the memory 804 and execute the computer-executable instructions loaded therein. For example, the processor(s) 802 may be configured to execute the computer-executable instructions of the various program module(s), applications, engines, or the like of the server 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit.

Referring now to functionality supported by the various program module(s) depicted in FIG. 8, the routing module(s) 826 may include computer-executable instructions, code, or the like that responsive to execution by one or more of the processor(s) 802 may perform one or more blocks of the process flows herein and/or functions including, but not limited to, determining vehicle conditions described herein based on data from vehicle devices and/or sensors, determining vehicle locations, determining antenna switching behavior, and/or the like.

The routing module 826 may be in communication with the vehicle 840, the third-party server 844, the user device 850, and/or other components. For example, the routing module may send data to the vehicle 840, receive data from the third-party server 844, receive user selections from the user device 850, and so forth to route the vehicle 840, if needed.

The driving module(s) 828 may include computer-executable instructions, code, or the like that responsive to execution by one or more of the processor(s) 802 may perform functions including, but not limited to, sending and/or receiving data, determining a vehicle condition, and the like. In some embodiments, the driving module 828 may be partially or wholly integral to the vehicle 840.

The driving module 828 may be in communication with the vehicle 840, the third-party server 844, the user device 850, and/or other components. For example, the driving module may send traffic information to the vehicle 840, receive location (e.g., jobsite) data from the third-party server 844, receive user inputs (e.g., login information for a wireless connection) from user device 850, and so forth.

Referring now to other illustrative components depicted as being stored in the data storage 820, the O/S 822 may be loaded from the data storage 820 into the memory 804 and may provide an interface between other application software executing on the server 800 and the hardware resources of the server 800.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. As noted, in various embodiments, databases may store information associated with antenna systems and/or vehicle conditions.

Referring now to other illustrative components of the server 800, the input/output (I/O) interface(s) 806 may facilitate the receipt of input information by the server 800 from one or more I/O devices as well as the output of information from the server 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The server 800 may further include one or more network interface(s) 808 via which the server 800 may communicate with any of a variety of other systems, platforms, networks, devices, and so forth. The network interface(s) 808 may enable communication, for example, with one or more wireless routers, one or more host servers, one or more web servers, and the like via one or more networks.

The sensor(s)/sensor interface(s) 810 may include or may be capable of interfacing with any suitable type of sensing device such as, for example, inertial sensors, force sensors, thermal sensors, photocells, and so forth.

The display component(s) 814 may include one or more display layers, such as LED or LCD layers, touchscreen layers, protective layers, and/or other layers. The optional camera(s) 816 may be any device configured to capture ambient light or images. The optional microphone(s) 816 may be any device configured to receive analog sound input or voice data. The microphone(s) 816 may include microphones used to capture sound.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module.

It should further be appreciated that the server 800 may include alternate and/or additional hardware, software, or firmware components beyond those described or depicted without departing from the scope of the disclosure.

The user device 850 may include one or more computer processor(s) 852, one or more memory devices 854, and one or more applications, such as a vehicle application 856. Other embodiments may include different components.

The processor(s) 852 may be configured to access the memory 854 and execute the computer-executable instructions loaded therein. For example, the processor(s) 852 may be configured to execute the computer-executable instructions of the various program module(s), applications, engines, or the like of the device to cause or facilitate various operations to be performed in accordance with one or more embodiments of the disclosure. The processor(s) 852 may include any suitable processing unit capable of accepting data as input, processing the input data in accordance with stored computer-executable instructions, and generating output data. The processor(s) 852 may include any type of suitable processing unit.

The memory 854 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

Referring now to functionality supported by the user device 850, the vehicle application 856 may be a mobile application executable by the processor 852 that can be used to present options and/or receive user inputs of information related to network status, external connections, user device status and/or the like.

The vehicle 840 may include one or more computer processor(s) 860, one or more memory devices 862, one or more sensors 864, and one or more applications, such as an autonomous driving application 866. Other embodiments may include different components. A combination or sub combination of these components may be integral to the controller 706 in FIG. 7.

The processor(s) 860 may be configured to access the memory 862 and execute the computer-executable instructions loaded therein. For example, the processor(s) 860 may be configured to execute the computer-executable instructions of the various program module(s), applications, engines, or the like of the device to cause or facilitate various operations to be performed in accordance with one or more embodiments of the disclosure. The processor(s) 860 may include any suitable processing unit capable of accepting data as input, processing the input data in accordance with stored computer-executable instructions, and generating output data. The processor(s) 860 may include any type of suitable processing unit.

The memory 862 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

Referring now to functionality supported by the vehicle 840, the autonomous driving application 866 may be a mobile application executable by the processor 860 that can be used to receive data from the sensors 864, and/or control operation of the vehicle 840.

One or more operations of the methods, process flows, and use cases of FIGS. 1-9 may be performed by one or more engines, program module(s), applications, or the like executable on an electronic device. It should be appreciated, however, that such operations may be implemented in connection with numerous other device configurations.

The operations described and depicted in the illustrative methods and process flows of FIGS. 1-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

In example 1, a device is described, the device including: at least one memory device that stores computer-executable instructions; and at least one processor configured to access the at least one memory device, wherein the at least one processor is configured to execute the computer-executable instructions to: determine a condition associated with a vehicle; determine, based on the condition, a switching state between a first antenna external to the vehicle and a second antenna internal to the vehicle; and transmit, based on the switching state and via the first antenna, a first signal on a first frequency and on a first network or on a second network; or transmit, based on the switching state and via the second antenna, a second signal on a second frequency on the first network.

Example 2 may include the device of example 1 where the computer-executable instructions to determine the condition comprise the computer-executable instructions to determine a state of motion of the vehicle or to determine a speed of the vehicle.

Example 3 may include the device of example 1 where the computer-executable instructions to determine the condition comprise the computer-executable instructions to determine a presence of at least one other vehicle having a wireless capability in a proximity of the vehicle.

Example 4 may include the device of example 1 where the computer-executable instructions to determine the condition comprises computer-executable instructions to determine an arrival of the vehicle at a location, determine a departure of the vehicle from the location, to determine a change of the vehicle's location, or determine an amount of time that the vehicle is at the location.

Example 5 may include the device of example 1 where the computer-executable instructions to determine the condition comprises computer-executable instructions to: detect a presence of an access point in a proximity of the vehicle; and select the second antenna for the transmission of the second signal.

Example 6 may include the device of example 1 where the computer-executable instructions to determine the condition comprises computer-executable instructions to: detect a presence of at least one user inside the vehicle; and select the second antenna for the transmission of the second signal.

Example 7 may include the device of example 1 where the computer-executable instructions to determine the condition comprises computer-executable instructions to: determine a lack of an access point in a proximity of the vehicle; and select the first antenna for the transmission of the first signal.

Example 8 may include the device of example 1 where the at least one processor is further configured to execute the computer-executable instructions to: combine, via a diplexer, the first signal and the second signal into a combined signal; and couple, via a coupler, the combined signal to the first antenna.

Example 9 may include the device of example 1 where the at least one processor is further configured to execute the computer-executable instructions to: transmit, via a third antenna internal to the vehicle, a third signal on the first frequency or on the second frequency and on the first network.

Example 10 may include a system, comprising: a first antenna external to a vehicle and configured to transmit a first signal on a first frequency and configured to operate on a first network and a second network; a second antenna internal to the vehicle and configured to transmit a second signal on a second frequency and configured to operate on the first network; and a switching device configured to switch between the first antenna and the second antenna based on a condition associated with the vehicle.

Example 11 may include the system of example 10 where the condition comprises at least one of: a state of motion of the vehicle, a speed of the vehicle, a presence of at least one other vehicle having a wireless capability in a proximity of the vehicle, an arrival of the vehicle at a location, a departure of the vehicle from the location, a change in the vehicle's location, or an amount of time that the vehicle is at the location.

Example 12 may include the system of example 10 and may further include a third antenna internal to the vehicle and configured to communicate on the first frequency and the second frequency and configured to operate on the first network.

Example 13 may include the system of example 10 where the system is further configured to: detect a presence of an access point in a proximity of the vehicle; and switch, via the switching device, to the second antenna.

Example 14 may include the system of example 10 where the system is further configured to: detect a presence of at least one user inside the vehicle; and switch, via the switching device, to the second antenna.

Example 15 may include the system of example 10 where the system is further configured to: determine a lack of an access point in a proximity of the vehicle; and switch, via the switching device, to the first antenna.

Example 16 may include a method, comprising: determining a condition associated with a vehicle; determining, based on the condition, a switching state associated with a first antenna external to the vehicle and a second antenna internal to the vehicle; and transmitting, based on the switching state and via the first antenna, a first signal on a first frequency and on a first network or on a second network; or transmitting, based on the switching state and via the second antenna, a second signal on a second frequency on the first network.

Example 17 may include the method of example 16 where determining the condition comprises determining a state of motion of the vehicle or determining a speed of the vehicle.

Example 18 may include the method of example 16 where determining the condition comprises: determining an arrival of the vehicle at a location, determining a departure of the vehicle from the location, determining a change in the vehicle's location, or determining an amount of time that the vehicle is at the location.

Example 19 may include the method of example 16 where detecting a presence of an access point in a proximity of the vehicle; and selecting the second antenna for the transmission of the second signal.

Example 20 may include the method of example 16 where detecting a presence of at least one user inside the vehicle; and selecting the second antenna for the transmission of the second signal.

What is claimed is:

1. A device, comprising:
   at least one memory device that stores computer-executable instructions; and
   at least one processor configured to access the at least one memory device, wherein the at least one processor is configured to execute the computer-executable instructions to:
      determine a condition associated with a vehicle, wherein to determine the condition comprises the computer-executable instructions to determine an arrival of the vehicle at a location, determine a departure of the vehicle from the location, determine a change of the vehicle's location, or determine an amount of time that the vehicle is at the location;
      determine, based on the condition, a switching state between a first antenna external to the vehicle and a second antenna internal to the vehicle; and
      transmit, based on the switching state and via the first antenna, a first signal on a first frequency and on a first network or on a second network; or
      transmit, based on the switching state and via the second antenna, a second signal on a second frequency on the first network.

2. The device of claim 1, wherein the computer-executable instructions to determine the condition comprises the computer-executable instructions to determine a state of motion of the vehicle or to determine a speed of the vehicle.

3. The device of claim 1, wherein the computer-executable instructions to determine the condition comprises the computer-executable instructions to determine a presence of at least one other vehicle having a wireless capability in a proximity of the vehicle.

4. The device of claim 1, wherein the computer-executable instructions to
   determine the condition comprises computer-executable instructions to:
      detect a presence of an access point in a proximity of the vehicle; and
      select the second antenna for the transmission of the second signal.

5. The device of claim 1, the computer-executable instructions to determine the condition comprises computer-executable instructions to:
   detect a presence of at least one user inside the vehicle; and
   select the second antenna for the transmission of the second signal.

6. The device of claim 1, the computer-executable instructions to determine the condition comprises computer-executable instructions to:
   determine a lack of an access point in a proximity of the vehicle; and
   select the first antenna for the transmission of the first signal.

7. The device of claim 1, wherein the at least one processor is further configured to execute the computer-executable instructions to:
   combine, via a diplexer, the first signal and the second signal into a combined signal; and
   couple, via a coupler, the combined signal to the first antenna.

8. The device of claim 1, wherein the at least one processor is further configured to execute the computer-executable instructions to:
   transmit, via a third antenna internal to the vehicle, a third signal on the first frequency or on the second frequency and on the first network.

9. A system, comprising:
   a first antenna external to a vehicle and configured to transmit a first signal on a first frequency and configured to operate on a first network and a second network;
   a second antenna internal to the vehicle and configured to transmit a second signal on a second frequency and configured to operate on the first network; and
   a switching device configured to switch between the first antenna and the second antenna based on a condition associated with the vehicle, wherein the condition comprises at least one of a state of motion of the vehicle, a speed of the vehicle, a presence of at least one other vehicle having a wireless capability in a proximity of the vehicle, an arrival of the vehicle at a location, a departure of the vehicle from the location, a change in the vehicle's location, or an amount of time that the vehicle is at the location.

10. The system of claim 9, further comprising a third antenna internal to the vehicle and configured to communicate on the first frequency and the second frequency and configured to operate on the first network.

11. The system of claim 9, wherein the system is further configured to:
    detect a presence of an access point in a proximity of the vehicle; and
    switch, via the switching device, to the second antenna.

12. The system of claim 9, wherein the system is further configured to:
    detect a presence of at least one user inside the vehicle; and
    switch, via the switching device, to the second antenna.

13. The system of claim 9, wherein the system is further configured to:
    determine a lack of an access point in a proximity of the vehicle; and
    switch, via the switching device, to the first antenna.

14. A method, comprising:
    determining a condition associated with a vehicle, wherein determining the condition comprises determining an arrival of the vehicle at a location, determining a departure of the vehicle from the location, determining a change in the vehicle's location, or determining an amount of time that the vehicle is at the location;

determining, based on the condition, a switching state associated with a first antenna external to the vehicle and a second antenna internal to the vehicle; and transmitting, based on the switching state and via the first antenna, a first signal on a first frequency and on a first network or on a second network; or transmitting, based on the switching state and via the second antenna, a second signal on a second frequency on the first network.

15. The method of claim 14, wherein determining the condition comprises determining a state of motion of the vehicle or determining a speed of the vehicle.

16. The method of claim 14, wherein determining the condition comprises:

detecting a presence of an access point in a proximity of the vehicle; and selecting the second antenna for the transmission of the second signal.

17. The method of claim 14, wherein determining the condition comprises:

detecting a presence of at least one user inside the vehicle; and selecting the second antenna for the transmission of the second signal.

* * * * *